No. 793,620. PATENTED JUNE 27, 1905.
A. A. BAILLEY.
LIMIT GAGE.
APPLICATION FILED JULY 29, 1904.
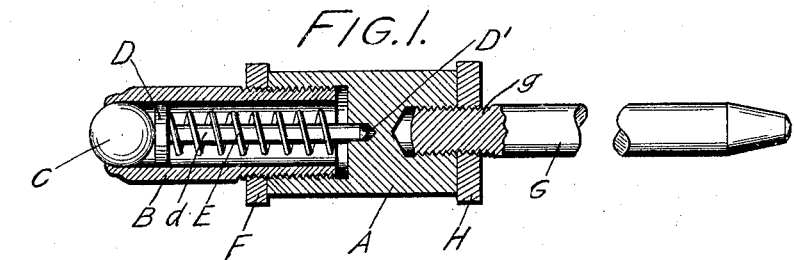
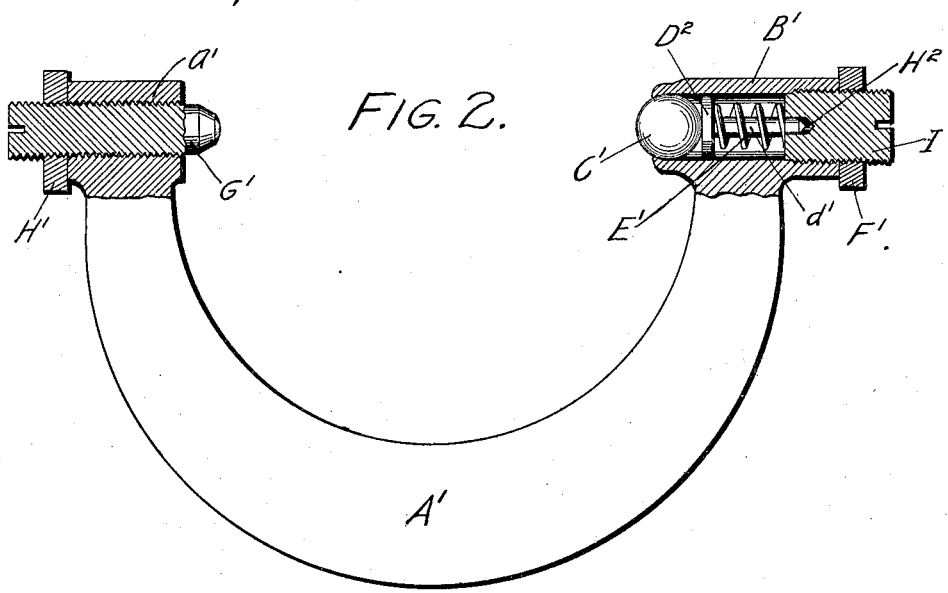
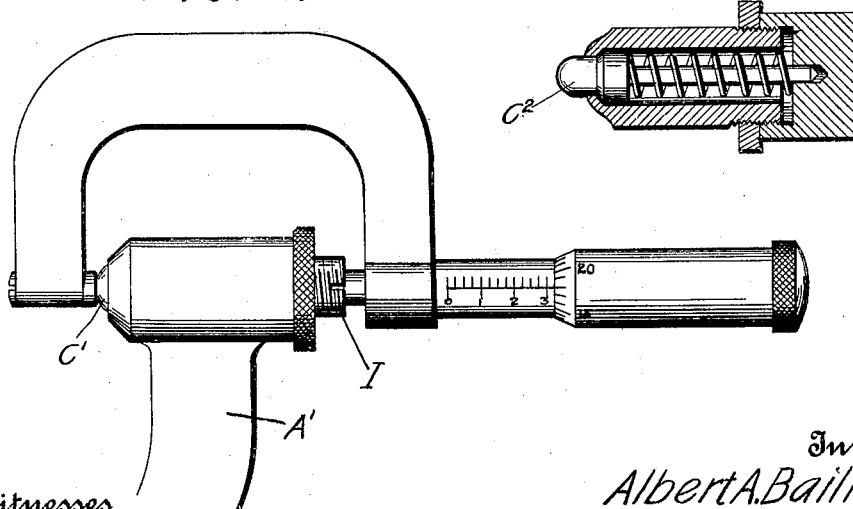
Witnesses
P. H. Mallinckrott.
James R. Mansfield.
Inventor
Albert A. Bailley
by Alexander & Dowell
Attorneys No. 793,620.

Patented June 27, 1905.

UNITED STATES PATENT OFFICE.

ALBERT A. BAILLEY, OF COHOES, NEW YORK.

LIMIT-GAGE.

SPECIFICATION forming part of Letters Patent No. 793,620, dated June 27, 1905.

Application filed July 29, 1904. Serial No. 218,725.

*To all whom it may concern:*

Be it known that I, ALBERT A. BAILLEY, of Cohoes, in the county of Albany and State of New York, have invented certain new and useful Improvements in Limit-Gages; and I hereby declare that the following is a full, clear, and exact description thereof, reference being had to the accompanying drawings, which form part of this specification.

This invention is an improvement in measuring instruments or limit-gages for use in the manufacture or selection of interchangeable parts of machines.

The ordinary "limit-gage" is simply a piece of metal with two openings in it, or two diameters, one slightly larger than the size of the piece to be gaged and the other slightly smaller. If a finished piece will enter or fit the larger part of the gage, but will not enter or fit the smaller part, it is considered acceptable, although different pieces of like form and intended to be used interchangeably may not be exactly alike measured by a micrometer.

The object of the present invention is to simplify the gages by requiring but one opening or diameter or length of gage and to provide such a gage with a yielding adjustable part which can be fixedly set to a predetermined measurement, such as the exterior or interior length or diameter of a certain object, and also without altering its adjustment will allow a limited variation in the size of such objects, such as will not affect their practical interchangeability, so that the workman using the gage will not lose time in measuring to an absolute scale, and yet cannot make such variations in measurement as will affect the practical interchangeability of the parts. For this purpose the device has a "size-adjusting" means and a "limit-adjusting" means, the latter being an automatically-adjustable contact-point which can slightly yield to pressure, and anything which will fit closely between the contact-points of the size and limit indicators will be serviceable and interchangeable with other similar parts of like dimensions, although one may and the other may not cause the limit-gage to yield.

In my limit-gage no absolute measurements and gradations for the allowable-variation regulator are required. This device moves between two fixed limits—that is, its possible extent of movement is definitely limited in both directions, and the distance between these fixed limits determines the extent of possible practical variation of similar objects, although these may differ in size if measured by a micrometer. The workman, however, does not have to note any scale or index, as necessary in using a micrometer-gage.

I will now explain the device in detail in connection with the drawings, which illustrate several modifications or variations of the device to show its adaptability to measuring different objects, and refer to the claims appended to the description for concise summaries of the features and parts for which protection is desired.

In the accompanying drawings, Figure 1 is a side view of a gage, partly in section, adapted for interior or linear measurements. Fig. 2 is a similar view of a gage especially suitable for exterior or diametrical measurements. Fig. 3 is a detail section of a slight modification. Fig. 4 is a detail showing the manner of adjusting the outside gage.

The body of handle portion may be straight, as in Fig. 1, or curved, as in Fig. 2, its shape being varied according to the particular design or use of the gage. To one end of the body is attached an adjustable size-regulating rod or bar, and to the other end thereof is attached the adjustable limit or "allowable-variation" regulator. As shown in Fig. 1, the size-regulating device G is a rod or bar of metal, which is threaded on one end, as at $g$, to engage a correspondingly-threaded socket in one end of the body or handle A and is locked by a jam-nut H, screwed on part $g$ and abutting against the end of the body. The locking device shown in the drawings is probably the most simple. Any other locking device can, however, be substituted. To the opposite end of the handle or body A is attached the allowable-variation regulator. As shown, this comprises a ball C, confined in a cylinder B, the outer end of which is slightly contracted, so as to prevent escape of the ball while allowing it to slightly project therefrom. The ball is pressed forward by a spring E, which is interposed between the body A and a follower D and surrounds the stem $d$, attached to the follower at one end and having its inner end guided in a small recess D' in the body, the depth of this recess and the adjustment of the cylinder B determining the extent or limit of variation in size of the objects to be measured by the gage while remaining practically interchangeable. The cylinder B, as shown in Fig. 1, is exteriorly threaded on one end and screwed into an internally-threaded socket in the body A, and it can be slightly adjusted (thereby varying the size measurement) by screwing it in or out, and it can be locked when adjusted by a jam-nut F thereon, as indicated in the drawings. This particular tool is useful for measuring internal dimensions, but is not restricted to such particular use.

As shown in Fig. 2, the handle or body A' is arc-shaped and the size-adjusting rod G' is tapped through a threaded opening $a'$ in one end of the handle and can be locked when adjusted by the jam-nut H'. The other end of the handle is provided with a cylindrical chamber B' in axial alinement with part G', and a ball C' is confined in the inner end of this chamber, just as the ball C in Fig. 1, and is pressed forward yieldingly by a spring E' strung on a stem $d'$ between the follower $D^2$ and a plug I, screwed into the outer end of the chamber B' and provided with a jam-nut F'. The rear end of stem $d'$ is seated in a recess $H^2$ in plug I and limits the allowable variation in measurements between the point of rod G' and the ball C'. This tool is more particularly adapted for measuring the external sizes of objects. The rod G or G' may be of any desired length to suit the work, or interchangeable rods of different lengths can be used with the same body.

As shown in Fig. 3, instead of the ball C or C' a protruding knob or head $C^2$ is formed on the follower and takes the place of the ball.

It will be observed that Figs. 1, 2, 3 show different modifications of construction of the allowable-variation regulator or device controlling the possible practical variation in sizes of interchangeable parts.

The device may be used in manufacturing or selecting interchangeable parts of machines where it is not essential that such parts be of the same dimensions with mathematical exactness. The device should be set so that the distance between the points of the bar G or G' and the ball or head C, C', $C^2$ (according to which form is used) shall be one extreme of measurement, and this, less the distance which the ball or head can recede, is the other extreme, the limit of possible allowable variation being determined by the amount of play allowed the ball or head.

Operation: The mode of using this gage, or rather setting the gage for use, is various, according to the equipment and facilities at hand of the user. The proper way is to adjust the gage for limit first, then for size. This can be done as follows: Using a micrometer, caliper the two extremities lightly, note the size on the micrometer, then caliper tight, causing the plunger to recede and strike bottom (which can be readily felt) and note differences in measurement. If more or less limit is required, screw limit end in or out, as the case may be, and lock in place. Then adjust size rod or bar until largest (in the case of internal) or smaller (in the case of external) allowable size is obtained, calipering lightly.

Many shops are provided with a twenty-four-inch micrometer or measuring-machine. If, however, it is necessary to set the inside gage to any size beyond the capacity of the micrometer at hand, an extra short bar can be used in setting for limit and then be replaced by the proper rod, which can then be set for size, using a sample of the work or a pair of calipers or anything most available. The outside gage can be set for limit with a small micrometer by calipering over the extremities of C' and I, as shown in Fig. 4.

This tool can be used with or without limit, and although it may be set for a certain amount of limit it can be used to measure to an absolute scale, if desired. As a limit-gage it has the advantage of having the largest and smallest allowable sizes embodied in a single tool, thereby saving time and cost of using two separate tools or double end gages. As a limit-gage it has the advantages of being adjustable for limit as well as for size. It can be set to any given size and used as a fixed gage. Another feature is that the internal limit-gage is self-centering. In measuring the diameter of a round hole ordinary calipers or a fixed gage will often stick or bind when not held perfectly central, especially when the hole is nearly finished to size. This gage will, however, readily find the center.

Having thus described my invention, what I therefore claim as new, and desire to secure by Letters Patent thereon, is—

1. A limit-gage to determine within allowable variations the dimensions of similar interchangeable objects having one relatively fixed terminal, a hollow chamber at its other terminal in axial alinement with the fixed terminal, and an allowable-variation regulator in said chamber, comprising a yielding point or contact projecting from one end of such chamber and movable directly toward or from the fixed terminal, said contact being movable only between two fixed limits which determine the possible allowable variations in dimensions of similar interchangeable objects, and a spring for holding the contact normally in one extreme position, substantially as and for the purpose described.

2. In a measuring device, the combination of a handle, a size-regulating rod having a threaded engagement with one end thereof, an allowable-variation regulator on the other end of said handle comprising a contact movable between two fixed limits which determine the possible allowable variations in dimensions of similar interchangeable objects, a spring-actuated follower for pushing the contact outwardly, adjustable means for varying the limit of movement of the regulator, and means for locking said adjusting means, substantially as described.

3. In a measuring device, the combination of a handle, a size-regulating rod having a threaded engagement with one end thereof, and a jam-nut for locking said rod; a contact loosely attached to the other end of said handle and movable between two fixed limits which determine the possible allowable variation in size of like objects, a spring-actuated follower for pushing the contact outwardly, adjustable means for varying the limit of movement of the regulator, and means for locking said adjusting means, substantially as described.

In testimony that I claim the foregoing as my own I affix my signature in presence of two witnesses.

ALBERT A. BAILLEY.

In presence of—
FREDK. W. J. McKIBBIN,
GRACE TOMPKINS.